United States Patent

[11] 3,632,445

| [72] | Inventor | Marcel Jean Charles Barre |
| | | Faches Thumesnil, France |
| [21] | Appl. No. | 805,528 |
| [22] | Filed | Mar. 10, 1969 |
| [45] | Patented | Jan. 4, 1972 |
| [73] | Assignee | Societe Sucrier De L'Atlantique |
| | | (Engineering) |
| | | Paris, France |
| [32] | Priorities | Mar. 26, 1968 |
| [33] | | France |
| [31] | | 145338; |
| | | Feb. 14, 1969, France, No. 6903606 |

[54] APPARATUS FOR EXTRACTING SOLUBLE SUBSTANCES FROM PLANT OR VEGETABLE PRODUCTS
43 Claims, 13 Drawing Figs.

[52] U.S. Cl. .................................................. 127/3,
23/269, 23/270 R, 127/5, 210/189
[51] Int. Cl. ............................................ B01d 11/02,
C13d 1/12
[50] Field of Search ................................... 127/2, 3, 5;
23/269, 270, 270 B; 210/189; 100/73

[56] References Cited
UNITED STATES PATENTS

| 1,089,495 | 3/1914 | Raabe ............................ | 127/5 |
| 2,658,010 | 11/1953 | Silver ............................ | 23/270 B |
| 3,122,422 | 2/1964 | Roots ............................ | 23/270 B |
| 3,279,890 | 10/1966 | Szasz ............................ | 23/270 B |

Primary Examiner—Joseph Scovronek
Assistant Examiner—Sidney Marantz
Attorney—Hugo Weisburger ABSTRACT: Apparatus for extracting soluble substances from plant or vegetable products. The apparatus comprises an annular element having a series of radial compartments open on the inner and outer peripheries of the annular element. The annular element is driven about a substantially horizontal axis and a fixed enclosure substantially marries up with at least the lower part of the annular element. The enclosure comprises on each side of a vertical plane containing the axis of rotation of the annular element an inlet for solvent liquid and an outlet for the extract from the product. A device continuously pours the products into the successive radial compartments.

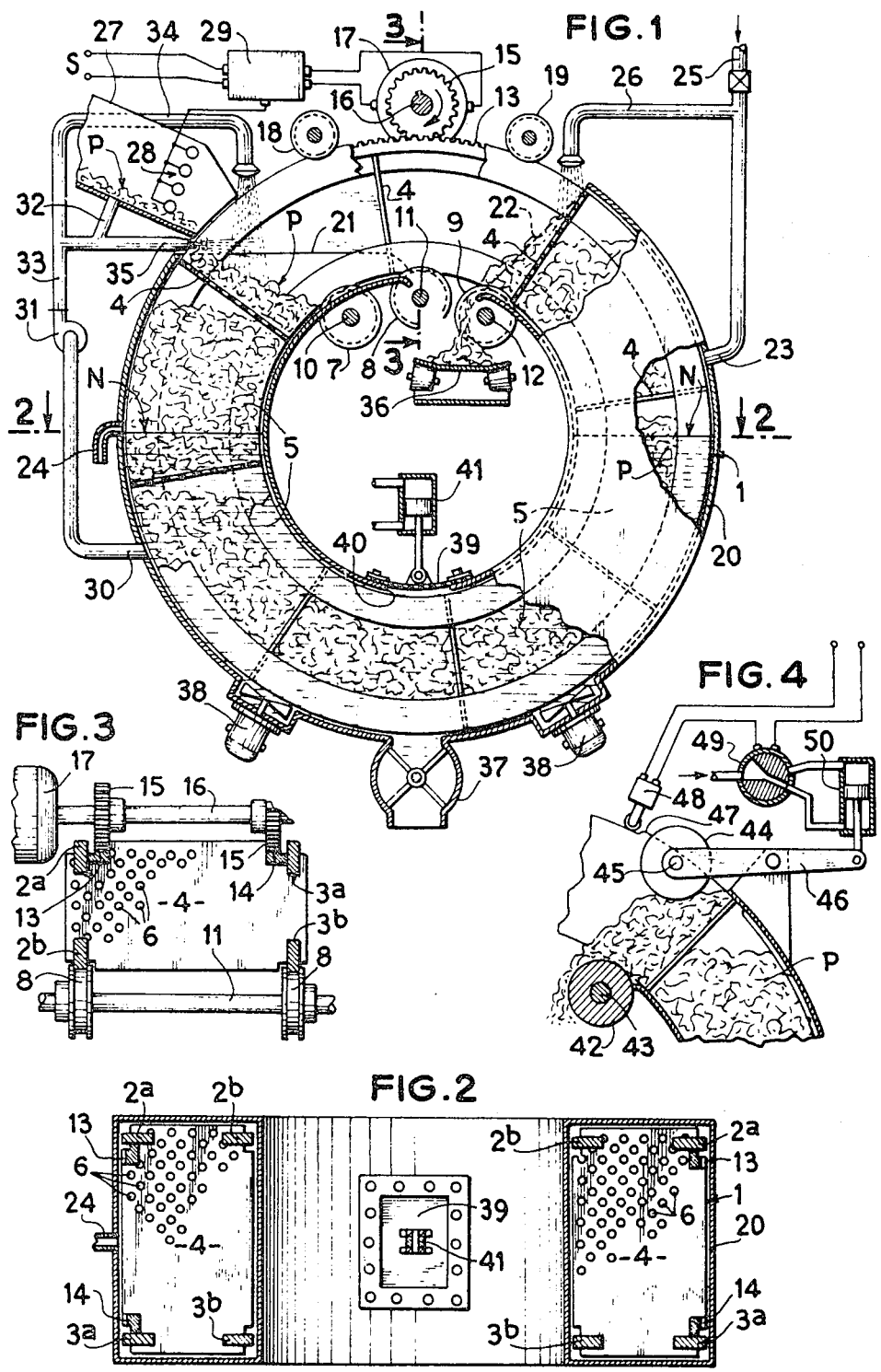

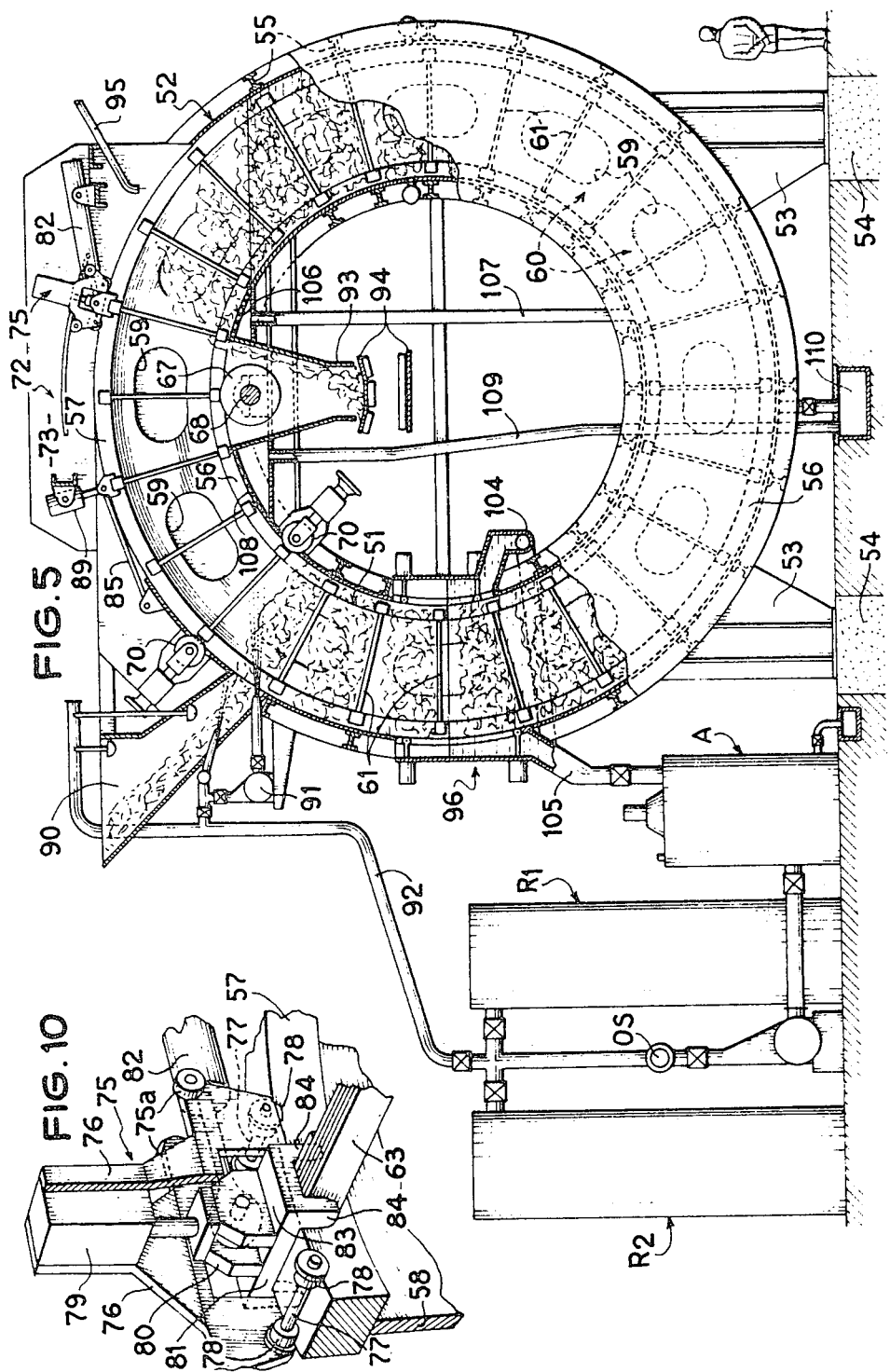

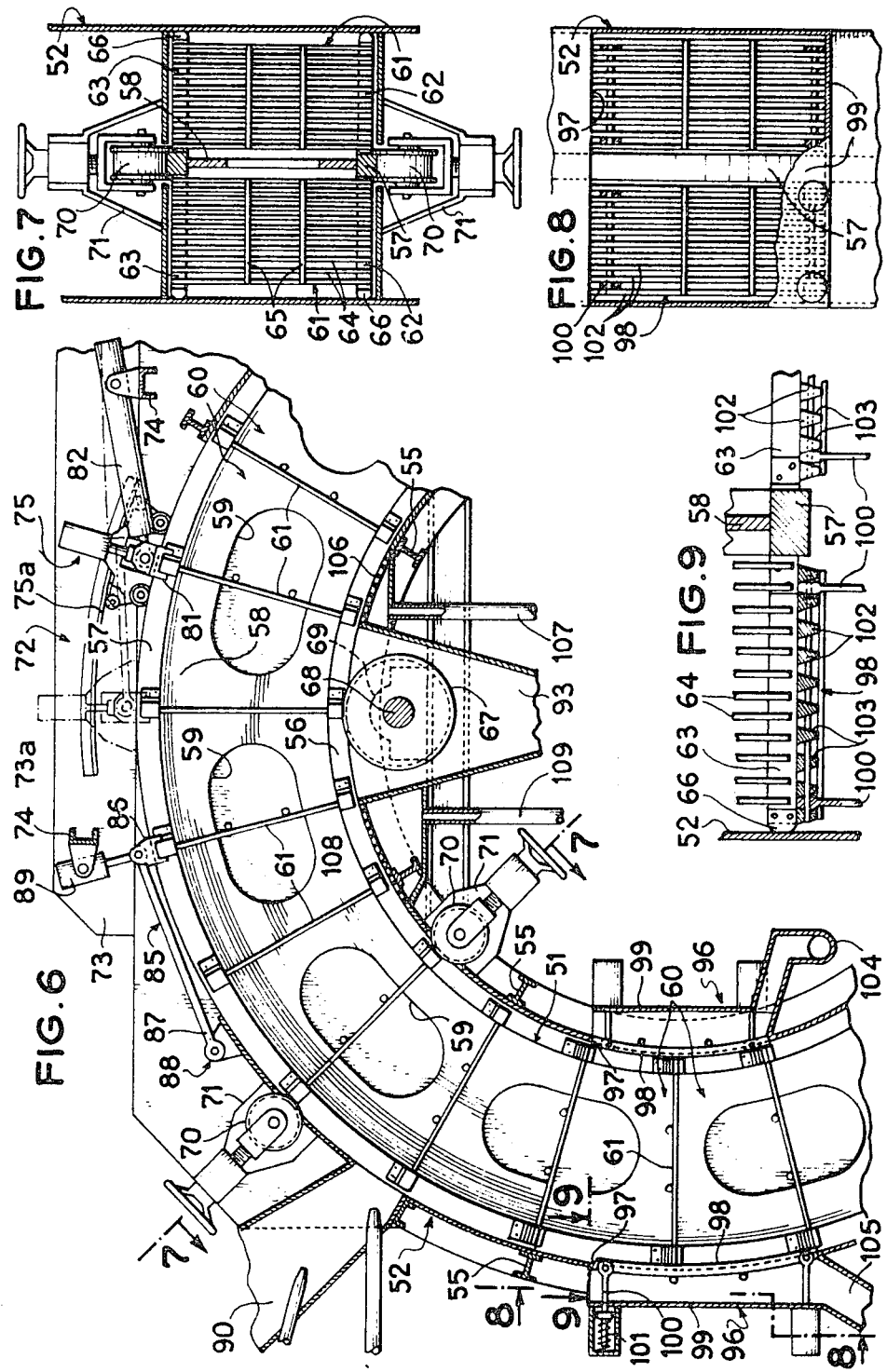

APPARATUS FOR EXTRACTING SOLUBLE SUBSTANCES FROM PLANT OR VEGETABLE PRODUCTS

The present invention relates to apparatuses for extracting soluble substances contained in products, such as plant or vegetable products in the divided state, for example in the form of seeds, nuts, roots in respect of beets, crushed or cut sugarcane, or bagasse. Soluble substances are usually extracted from such plant or vegetable products by means of a solvent liquid to which is added if desired appropriate chemical products and which is brought to a suitable temperature. The liquid comes in contact with the product and extracts the soluble materials in a manner which is particular to each considered product and based on a physical phenomenon which is also particular to the product. These phenomena can be, for example, osmosis, diffusion, lixiviation or percolation.

The object of the invention is to provide an apparatus for carrying out all these extracting processes, although it is particularly appropriate for the extraction of sugar from sugarcane or sugar beet.

The apparatus according to the invention is simple and carries out these processes with a high yield and a relatively short stay of the plant product in the apparatus.

The invention provides an apparatus for extracting soluble substances from products, such as plant or vegetable products, comprising an annular element having a series of radial compartments which are separated by perforated partition walls and open on the inner and outer peripheries of said annular element, said annular element being driven in rotation about a substantially horizontal axis, a fixed enclosure substantially marrying up with at least the lower part of said annular element and comprising, located on each side of a vertical plane containing the axis of the annular element, an input aperture for solvent liquid and an outlet aperture for the extract of the plant product, whereby to create inside said enclosure a flow of liquid whose direction is opposed to that of the rotation of said annular element, and a device for introducing plant products opening onto the periphery of said annular element so as to pour said product continuously into said successive compartments.

According to a first embodiment of the invention, said annular element comprises two coaxial pairs of concentric rings in spaced relation spaced apart by radial perforated partition walls, the inner rings of said concentric rings constituting raceways which cooperate with support rollers having horizontal axes, at least one of the outer rings of said concentric rings having a ring gear meshing with a gear pinion driven by a preferably electric motor.

An extracting apparatus arranged in this way is particularly appropriate for small installations wherein the total diameter of the annular element does not exceed about 5 meters.

According to another embodiment, intended for apparatuses whose diameter is distinctly greater, for example of the order of 12 meters, said annular element comprises two concentric rings spaced apart by a plane annular wall and having openwork partition walls in spaced relation and located on each side of said plane wall, said openwork partition walls being elastically mounted on said rings in such manner that their outer radial edge has an elastic freedom of movement relative to said rings.

In this case, each of said openwork partition walls can consist of two spring strips respectively fixed to said rings and axially extending therefrom, the spring strips being connected by parallel bars.

Owing to these particular features, the products which are carried in the compartments defined by the elastically yieldable openwork partition walls are prevented from becoming wedged between the enclosure and the outer edge of the partition walls, the spring strips having however sufficient stiffness to suitably convey the materials in the apparatus.

According to another feature, said annular element is driven by a step-by-step drive device which is preferably hydraulic.

Further features and advantages of the invention will be apparent from the ensuing description with reference to the accompanying drawings.

In the drawings:

FIG. 1 is a diagrammatic elevational view, with parts cut away, of an apparatus according to a first embodiment of the invention;

FIG. 2 is a view, taken along line 2—2 of FIG. 1;

FIG. 3 is a detail view, taken along line 3—3 of FIG. 1;

FIG. 4 is a diagrammatic view of a detail of a device for pressing the products issuing from the apparatus after treatment;

FIG. 5 is a diagrammatic elevational view, partly in section, of a sugar-extracting installation comprising an extracting apparatus according to a second embodiment of the invention;

FIG. 6 is an elevational view, partly in section, on an enlarged scale, of the upper part of the apparatus shown in FIG. 5;

Figure 11:
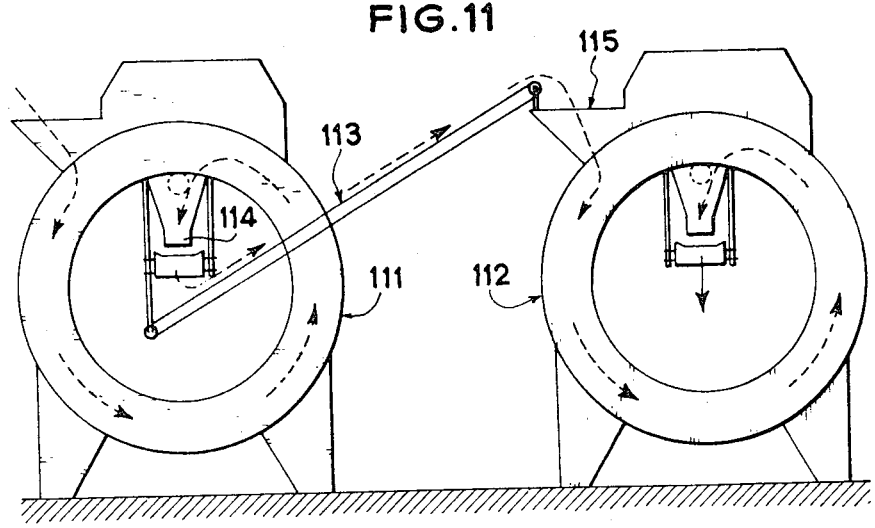
Figure 12:
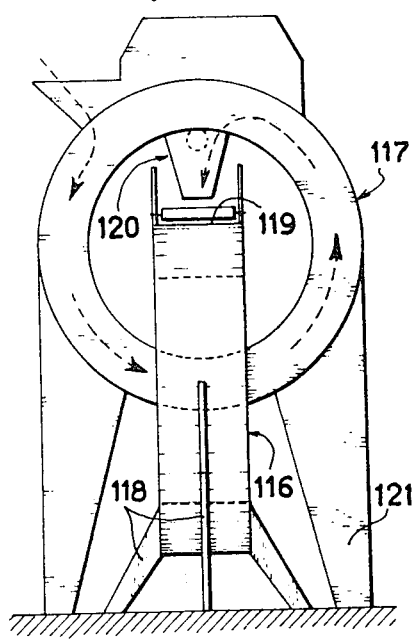
Figure 13:
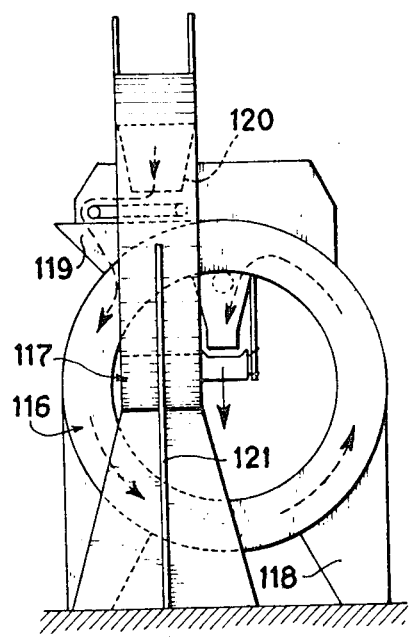

FIGS. 7, 8 and 9 are sectional views taken along lines 7—7, 8—8 and 9—9 of FIG. 6, FIG. 9 being on an enlarged scale;

FIG. 10 is a perspective view of a part of the step-by-step drive device on an enlarged scale;

FIG. 11 is a diagrammatic view showing two apparatuses according to the invention associated in series according to a first modification of the invention;

FIG. 12 is a diagrammatic view of the association of two apparatuses according to the invention in series according to a second modification of the invention, and FIG. 13 is a side elevational view of the arrangement shown in FIG. 12.

In the embodiment of the invention shown in FIGS. 1–3, the apparatus for extracting soluble substances contained in plant or vegetable products comprises an annular element 1 having a substantially horizontal axis and including two pairs of concentric rings 2a, 2b, 3a, 3b, respectively, which are spaced apart by perforated partition walls 4 which are secured radially to these rings and in spaced relation to each other. The perforations have appropriate dimensions selected as a function of the grain size of the product P treated in the apparatus. Thus, a series of compartments 5 is defined in the element, these compartments communicating with each other through apertures 6 and being open on the inner and outer peripheries of the annular element 1.

Three pairs of rollers 7, 8 and 9 are mounted to freely rotate on fixed spindles 10, 11 and 12 respectively so as to support the rings 2a, 2b, and 3a, 3b, which constitute raceways on which the rollers 7, 8 and 9 roll as they support the weight of the whole of the annular element 1. The rings 2a and 3a are integral with ring gears 13, 14 with which are meshed two gear pinions 15 keyed on a common shaft 16 which is driven in rotation by an electric motor 17 (see in particular FIG. 3). If desired, instead of the pinions 15, there could be provided a coupling device between the motor 17 and the ring gears 13, 14, this device including a pawl mechanism which rotates the apparatus in a step-by-step manner. Further, it is possible to drive the annular element merely by friction, in which case the ring gear can be omitted.

Two pairs of rollers 18 and 19, freely mounted on fixed spindles, cooperate with the outer faces of the rings 2a and 3a which act as raceways therefor. These rollers are adapted to prevent the annular element 1 from tilting over when it is driven in rotation about its horizontal axis.

The extracting apparatus comprises a fluidtight enclosure or case 20 which closely marries up with the lower part of the annular element 1, its two upper ends 21 and 22 being however open to allow the passage of the annular element 1 and for serving respectively as the inlet and outlet apertures for the product P. The enclosure 20, is for example, of metal sheets welded together and comprises on one side of the apparatus (right side as viewed in FIG. 1) an inlet aperture for solvent liquid 23 and, roughly diametrically opposed to this aperture, an outlet aperture 24 for taking off the mixture of solvent liquid and soluble substances contained in the product P. The liquid charged with soluble substances can thus leave the apparatus by overflowing. It is, of course, possible to provide a special pumping installation to accelerate the flow.

The inlet aperture 23 is connected to a pipe 25 supplying solvent liquid, this pipe comprising a branch pipe 26 for spraying the plant product when it leaves the apparatus. The product P to be treated enters the apparatus by way of a channel 27 which opens roughly radially above the inlet 21 of the enclosure 20 and continuously pours the product P into the successive compartments 5.

A group of photoelectric cells 28 located roughly vertically in the channel 27 is connected to an electric control device which is diagrammatically indicated at 29 and fed by the mains S, for example. This device transmits the signals furnished by the photoelectric cells 28 to the electric motor 17 so as to adjust the speed of rotation in accordance with the amount of product P poured into the apparatus. As the arrangement of the control device 29 is conventional, it will not be described in detail.

A pipe 30 communicates with the interior of the enclosure 20 below the liquid level N and a pump 31 feeds liquid charged with soluble substances to three other pipes 32, 33 and 34 which respectively serve to wet the product P in the passageway or channel 27, furnish a jet of horizontal liquid to the extreme lower edge of the channel 27 through a nozzle 35, and spray the product poured into the compartments 5. The nozzle 35 ensures an even distribution of the product P in the compartments 5.

A conveyor belt 36 located below the outlet aperture 22 of the enclosure 20 discharges the treated product.

The enclosure 20 communicates in its lower part with a mud or sediment discharge device 37 which is actuated periodically for removing the deposits which accumulate at the base of the enclosure 1.

Various agitating or stirring devices 38 are provided so as to produce currents in the liquid contained in the apparatus.

A flexible diaphragm 39, for example of rubber, closes in a fluidtight manner an opening 40 provided in the enclosure 20. This diaphragm can have imparted thereto a pulsating movement by a link and crank assembly (not shown) or a piston and cylinder assembly 41, for example controlled by compressed air. This movement creates oscillating currents in the liquid which encourage the mixing of the product P and thus improve the yield of the extracting apparatus. One or more vibrating devices can also be provided which subject the wall of the enclosure to vibrations of given frequency.

This apparatus operates in the following manner:

As the product P is poured continuously into the successive compartments 5 and the annular element 1 rotates at appropriate speed, the product P is conveyed to the outlet 22 of the enclosure 20 while being put in contact with the liquid whose level N is established at the height of the outlet aperture 24. The annular element therefore rotates in the counterclockwise direction as viewed in FIG. 1. The solvent liquid, in entering by way of the aperture 23 and issuing by way of the aperture 24, becomes charged in its path with soluble substances at a more or less high concentration. The relative movements of the solvent liquid and product P are therefore opposed and this contributes to considerably increasing the rate of extraction and the efficiency of the machine.

By way of example, the product can remain in the apparatus for about half an hour.

During the rotation of the annular element 1, the diaphragm 39 is subjected to an oscillatory movement so as to produce oscillating currents in the liquid and increase the mixing or stirring of the product P. FIG. 4 shows in detail a device for squeezing or draining the product P when it issues from the apparatus after the treatment so as to extract therefrom the remainder of soluble substances.

This device comprises a roller 42 which is mounted to freely rotate on a fixed spindle 43 and located just at the outlet 22 of the enclosure 20 so that the treated product P is constrained to pass over this roller to leave the apparatus.

The roller 42 cooperates with another roller 44 which is connected to a lever mechanism 46 having a pivot point which is fixed relative to the enclosure 20. One of the rings, for example the ring 2a, is provided with cams 47 in spaced relation which cooperate with a microswitch 48 and are in a number equal to the number of the partition walls 5. The microswitch 48 controls a two-way electrovalve 49 connected to a cylinder-piston assembly 50, the rod of the piston being connected to the end of the lever mechanism 46 opposed to the roller 44.

Thus the product P is periodically compressed by the two rollers 42 and 44 in the compartments 5 whereas upon the passage of each partition wall 4 the mobile roller 44 is raised.

According to a second embodiment shown in FIGS. 5–10, the extracting apparatus, forming part of an extracting installation, further comprises mainly an apparatus A regulating the pH of the juice extracted from the treated product, this apparatus being provided with a stirrer or agitator. Two heating columns $R_1$ and $R_2$ are connected to the apparatus A and to the following treating devices (not shown) through an outlet OS.

The extracting apparatus shown in FIGS. 5–10 comprises an annular element 51 surrounded by an enclosure or case 52 which rests on a frame 53 anchored in the ground on two bases 54. The enclosure 52 is preferably of low-alloy steel sheet and has on its outer face transverse stiffening beams 55 which impart the required stiffness to the assembly. This enclosure can be provided if desired with an outer layer of heat-insulating material. The dimensions of the enclosure are by way of example: outside diameter 12 meters, inside diameter 9 meters, width 4 meters.

The annular element 51 comprises two concentric rings 56, 57 of rectangular section (FIGS. 5–7) which are spaced apart by an annular wall 58 contained in a vertical median plane perpendicular to the axis of the apparatus. The wall 58 divides the apparatus into two annular parts which intercommunicate by way of oblong openings 59 in the wall 58. The annular element 51 is further divided into a series of radial compartments 60 by openwork partition walls 61 (see in particular FIG. 7). These partition walls, which are arranged in pairs on each side of the wall 58, each comprises two spring strips 62 and 63 fixed to the inner ring 66 and outer ring 67 respectively and extending in a direction parallel to the axis of the apparatus. The spring strips are interconnected by bars 64 which are interconnected by transverse members 65. The ends of the spring strips 62 and 63 are capped by slide shoes 66 which are preferably of bronze and rounded. These shoes are adapted to reduce friction against the enclosure in the event that the annular element becomes temporarily out of center relative to the horizontal axis of the apparatus due to an unevenly distributed charge.

The annular element 51 bears on a roller 67 having flanges and mounted to rotate on a spindle 68 which bears in bearings 69 integral with the enclosure 52. Two regulating rollers 70 whose axes are in a common radial plane (FIGS. 6 and 7) are engaged with the outer ring 57 and inner ring 56 respectively. They are slidably mounted in supports 71 connected to the enclosure 52 in such manner that their position relative to the axis of the apparatus can be adjusted so as to exactly center the annular element 51 in the enclosure 51 in accordance with various conditions of operation which could arise.

The annular element 51 is driven in rotation by a step-by-step drive device 72 (FIGS. 6 and 7). This drive device is mounted between two vertical plates 73 only one of which is visible in the FIGS. These plates are integral with the enclosure 52 and braced by U-section members 74. A carriage 75 comprises two sidewalls 76 which are spaced apart on their lower part by two shafts 77 and four rollers 78, the latter rolling on the edges of the outer face of the ring 57. A jack 79 is mounted between the upper parts of the sidewalls 76. The piston of the jack is integral with a fork 80 which carries a yoke 81. A thrust jack 82 is pivoted to one of the U-section members 74 between the plates 73, its piston rod being pivoted to the fork 80.

The yoke 81 comprises a rectangular web and four lugs 84 all of which extend from the same side of the web so that the yoke straddles both the outer ring 57 and each pair of spring strips 53 fixed to this ring.

The carriage 75 moves between the outer ring 57 and a guide rail 73a which cooperates with two rollers 75a rotatably mounted on the sidewalls 76 of the carriage 75. The roller 75a and the rail 73a prevent the carriage 75 from tipping over under the effect of the force of the thrust jack 82.

The carriage 75 cooperates with a pawl device 85 comprising a yoke 86 similar to the yoke 81 of the carriage 75 and mounted at the end of a link 87 which is pivoted at 88 to the enclosure 52 of the apparatus.

The yoke 86 is fixed to a piston rod which is part of a jack 89 mounted in a fork integral with the member 74. With this arrangement, the yoke 86 is radially movable but fixed in the circumferential direction relative to the axis of the apparatus. The yoke 86 can also straddle the outer ring 57 and each of the pairs of spring strips 63 so as to periodically arrest the movement of the annular element 51. The operation of the three jacks 79, 82 and 89 is carefully synchronized by a set of valves (not shown) which is of a construction obvious to specialists and has not been described.

The product to be treated in the apparatus is poured into an input hopper 90 provided with means for regulating the flow (for example photoelectric means) as described in respect of the apparatus shown in FIGS. 1–4, and a spraying device 91 fed, for example, from heating columns $R_1$ and $R_2$ through a recycling pipe 92 (FIG. 5).

Discharge is through a hopper 93 which pours the treated product into a conveyor 94.

Fresh water heated to the desired temperature is supplied through a pipe 95 whereas the charged juice is taken off at the outlet 96, a detailed description of which will be given hereinafter. Thus, there is established in the apparatus a flow of liquid and product in a countercurrent manner which enhances the efficiency of the apparatus.

The charged juice issues by way of two openings 97 (FIGS. 6 and 8), which have a relatively large area and are provided in the outer and inner walls respectively of the enclosure 52. Each of these openings is masked by a grill 98, a sleeve 99 surrounding the enclosure 52. The grills are elastically secured to the sleeve 99 by rods 100 which extend therethrough and are biased in the direction of the annular element by coil springs 101 so that they continuously rub on the spring strips 63 connected to the outer ring 57. Each grill consists of two assemblies of parallel trapezoidal bars 102 interconnected by crossmembers, the bars being oriented in planes perpendicular to the axis of the apparatus and slightly curved so as to be adapted to the curvature of the enclosure 52. These bars can, moreover, be oriented in different ways, for example in planes parallel to the axis of the apparatus or in an inclined manner. The large base of the section of each of the bars 102 faces the annular element. Elongate slots 103 formed in the grills 98 thus diverge outwardly so as to preclude any blocking of the product between the bars. Further, the leading edges of the spring strips 63 constitute knife edges which, during operation of the apparatus, rub against the inner face of the grill so as to sever pieces of product which might accumulate in the elongate slots.

A trough 104 forming the lower part of the sleeve 99 collects the juice which thereafter flows through a pipe 105 into the pH-regulating apparatus A.

The levels of liquid in the two upwardly extending branches of the apparatus can be different, depending on the speed of circulation of the liquid in the apparatus, the settling of the product treated, etc. An overflow aperture 106 is provided for possibly discharging the liquid when its level near the inlet 95 rises above a predetermined value. The liquid is then discharged toward the base of the apparatus through a pipe 107. Further, in the event that the outlet 96 becomes clogged, an overflow aperture 108 is provided which communicates with a drainpipe 109 by way of a pipe 110. The drainpipe 109 can also receive the draining and cleaning waters of the apparatus, these operations being carried out after a period of operation.

The extracting apparatus described hereinbefore can comprise stirring or agitating devices, oscillating diaphragms, draining or squeezing devices etc., similar to those described hereinbefore in respect of the apparatus shown in FIGS. 1–4.

Apart from a few differences concerning in particular the driving of the annular element, the apparatus just described operates in the same way as the apparatus shown in FIGS. 1–4 so that only the operation of the step-by-step drive device will be described hereinafter.

This device 72 effects a repeated working cycle. Assuming that the situation is that shown in FIGS. 5 and 6 in full line, the jack 89 is first actuated so as to raise the yoke 86 which turns about the pivot 88. With the jack 89 retracted, the carriage 75 is advanced by the thrust jack 82, the jack 79 locking the yoke 81 and maintaining it in the position where its straddles the outer ring 57 and the two spring strips 63 of the partition walls 61 presented in front of the drive device. The carriage 75 advances and drives the annular element 51 through a distance equal for example to the distance between two pairs of consecutive partition walls 61 (position shown in dot-dash line in FIG. 2).

The jack 89 is then once more actuated so as to lower the yoke 86 which locks the annular element 51 in its new position. The jack 79 raises the yoke 81 and the jack 82 returns the carriage to its initial position. Thus, a new cycle of operation can commence. It will be understood that the jacks are suitably synchronized and that safety and interlocking devices can be provided for ensuring good operation of the apparatus. The movement of the annular element 51 is preferably discontinuous, the jack 82 first operating for 1 minute and 30 seconds, for example, so as to advance the element, after which a pause of 30 seconds allows the carriage 75 to be withdrawn and other operations, such as the pressing of the product issuing from the apparatus and the cleaning of the compartments in the upper part of the apparatus, to be effected.

FIGS. 11, 12 and 13 respectively show two arrangements in which the two apparatuses are associated in series relation. The product treated in the first apparatus is conveyed to the second apparatus where it undergoes another extracting treatment.

In FIG. 11, two apparatuses 111 and 112 are placed side by side, a conveyor belt 113 connecting the outlet 114 of the first apparatus to the inlet 115 of the second apparatus.

In the arrangement shown in FIGS. 12 and 13, two apparatuses 116 and 117 are arranged in such manner that they interpenetrate in the manner of the links of a chain. The apparatus 116 is placed on a frame 118 so that its inlet 119 is located just below the outlet 120 of the apparatus 117 placed on a higher frame 121. Thus the product is treated in series in the two apparatuses.

Although specific embodiments of the invention have been described, many modifications and changes may be made therein without departing from the scope of the invention as defined in the appended claims.

Having now described my invention what I claim as new and desire to secure by Letters Patent is:

1. An apparatus for extracting soluble substances contained in products such as plant or vegetable products, said apparatus comprising an annular element having a series of radial compartments which are separated by perforated partition walls and are open on the inner and outer peripheries of said annular element, means for driving said annular element in rotation about a substantially horizontal axis, a fixed enclosure substantially marrying up with the lower part of said annular element and comprising, located on each side of a vertical plane containing the axis of the annular element, an inlet aperture for solvent liquid and an outlet aperture for the extract from the plant or vegetable product, whereby to create inside said enclosure a flow of liquid whose direction is opposed to that of the rotation of said annular element, and a device for continuously introducing plant or vegetable products opening onto the periphery of said annular element so as to pour said products continuously into said successive compartments, said annular element comprising two coaxial spaced pairs of concentric rings spaced apart by radial perforated partition walls, the inner rings of said rings constituting raceways, and support rollers, having horizontal spindles, said support rollers cooperating with said raceways.

2. An apparatus as claimed in claim 1, wherein said support rollers are slidably mounted in supports integral with said enclosure, whereby the distance between their axis and the axis of rotation of the annular element is adjustable.

3. An apparatus as claimed in claim 1, wherein a portion of the wall of said enclosure below the level of the liquid comprises a flexible diaphragm and said apparatus comprises a device for imparting a pulsatory motion to said diaphragm.

4. An apparatus as claimed in claim 1, comprising at least one vibrating device for subjecting the wall of said enclosure to vibrations of given frequency.

5. An apparatus as claimed in claim 1, comprising a spray device for spraying pure solvent liquid onto the plant or vegetable product issuing from the apparatus.

6. An apparatus as claimed in claim 1, wherein said device introducing the plant or vegetable product comprises means for detecting the flow of the product supplied to the apparatus, said means controlling said means driving said annular element in rotation as a function of said supply.

7. An apparatus as claimed in claim 1, comprising at least one agitating device located in the wall of said enclosure.

8. An apparatus as claimed in claim 1, comprising a fixed liquid-expelling device located adjacent to said outlet aperture for squeezing or draining said plant or vegetable product when it issues from said outlet aperture which comprises an assembly of compression rollers whose axes are parallel to the axis of the apparatus and are located on each side of the outlet of the apparatus, one of said compression rollers having a to-and-fro movement imparted thereto so as to move away from the other roller when a perforated partition wall passes in front of said expelling device and move towards the other roller during the passage of said successive compartments.

9 An apparatus as claimed in claim 1, wherein one of said outer rings of said rings has a ring gear meshed with a motor-driven gear pinion.

10. An apparatus as claimed in claim 1, comprising a device for taking off a part of the extract issuing from the apparatus and reinjecting said extract by spraying or projection into the plant or vegetable product entering said apparatus.

11. An apparatus as claimed in claim 10 wherein said taking off and reinjecting device comprises a pipe connected to said enclosure below the level of liquid, a pump connected to said pipe and discharging the extract through pipes respectively opening onto the inlet of the plant or vegetable product.

12. An apparatus as claimed in claim 1, wherein the outlet for the juice extracted from the treated product extends over portions of the outer and inner peripheral faces of said enclosure thus forming apertures, grills comprising substantially parallel bars being provided for masking said apertures, said grills being elastically biased towards said annular element.

13. An apparatus as claimed in claim 12, wherein said bars of said grills have a trapezoidal cross-sectional shape whose large base faces said annular element.

14. An apparatus as claimed in claim 13, wherein a sleeve surrounds said enclosure at the height of said outlet apertures, a trough located at the base of said sleeve serving to discharge the extracted juice.

15. An apparatus as claimed in claim 1, comprising a step-by-step drive device drivingly connected to said annular element.

16. An apparatus as claimed in claim 15, wherein said thrust device comprises a carriage having means whereby it is rollable on the outer face of at least one of said outer rings, a jack carried by said carriage, a yoke secured to said jack, hooking means on said annular element and with which said yoke is capable of cooperating, and a thrust jack bearing against said enclosure and pivoted to said yoke, said carriage being guided by a rail which is integral with said enclosure and prevents the carriage from tilting under the effect of the forces of said thrust jack.

17. An apparatus as claimed in claim 15, wherein said pawl device comprises a link pivoted to said enclosure, a pawl carried at the free end of said link, hooking means arranged in spaced relation on the periphery of said annular element and cooperating with said pawl, said pawl being radially movable by a jack bearing against said enclosure.

18. An apparatus as claimed in claim 15, wherein said drive device comprises, on the periphery of said apparatus, a thrust device which is movable radially and circumferentially of the apparatus and having a position of rest and capable of moving from said position of rest into engagement with said annular element, a pawl device which is radially movable but fixed circumferentially of said apparatus and cooperable with said thrust device, said pawl device being angularly offset relative to said position of rest of said thrust device, the movements of said thrust device and of said pawl device preferably being produced by means of hydraulic jacks having synchronized actions.

19. An apparatus as claimed in claim 18, comprising hydraulic jacks having synchronized actions for moving said thrust device and said pawl device.

20. An apparatus for extracting soluble substances contained in products such as plant or vegetable products, said apparatus comprising an annular element having a series of radial compartments which are separated by perforated partition walls and are open on the inner and outer peripheries of said annular element, means for driving said annular element in rotation about a substantially horizontal axis, a fixed enclosure substantially marrying up with the lower part of said annular element and comprising, located on each side of a vertical plane containing the axis of the annular element, an inlet aperture for solvent liquid and an outlet aperture for the extract from the plant or vegetable product, whereby to create inside said enclosure a flow of liquid whose direction is opposed to that of the rotation of said annular element, and a device for continuously introducing plant or vegetable products opening onto the periphery of said annular element so as to pour said products continuously into said successive compartments, said annular element comprising two spaced concentric rings, a plane annular wall interconnecting said two rings, said rings being combined with openwork partition walls which are in spaced relation and located on each side of said plane annular wall, said openwork partition walls being mounted in an elastically yieldable manner on said rings, whereby the outer radial edges of said openwork partition walls have an elastic freedom of movement relative to said rings.

21. An apparatus as claimed in claim 20, wherein said annular wall comprises openings putting said compartments on each side of said annular wall in communication with each other.

22. An apparatus as claimed in claim 20, wherein said rings have a rectangular cross-sectional shape, the inner ring bearing on a roller having flanges and rotatably mounted on said enclosure, said apparatus further comprising two auxiliary rotatable rollers having flanges which are respectively in engagement with the inner and outer rings.

23. An apparatus as claimed in claim 20, wherein a portion of the wall of said enclosure below the level of the liquid comprises a flexible diaphragm and said apparatus comprises a device for imparting a pulsatory motion to said diaphragm.

24. An apparatus as claimed in claim 20, comprising at least one vibrating device for subjecting the wall of said enclosure to vibrations of given frequency.

25. An apparatus as claimed in claim 20, comprising a spray device for spraying pure solvent liquid onto the plant or vegetable product issuing from the apparatus.

26. An apparatus as claimed in claim 20, wherein said device introducing the plant or vegetable product comprises means for detecting the flow of the product supplied to the apparatus, said means controlling said means driving said annular element in rotation as a function of said supply.

27. An apparatus as claimed in claim 20, comprising at least one agitating device located in the wall of said enclosure.

28. An apparatus as claimed in claim 20, comprising a fixed liquid-expelling device located adjacent to said outlet apertures for squeezing or draining said plant or vegetable product when it issues from said aperture, which comprises an assembly of compression rollers whose axes are parallel to the axis of the apparatus and are located on each side of the outlet of the apparatus, one of said compression rollers having a to-and-fro movement imparted thereto so as to move away from the other roller when a perforated partition wall passes in front of said expelling device and move towards the other roller during the passage of said successive compartments.

29. An apparatus as claimed in claim 20, wherein each of said openwork partition walls comprises two spring strips respectively connected to said rings and extending axially therefrom, said spring strips being interconnected by parallel bars.

30. An apparatus as claimed in claim 29, wherein said spring strips have free ends capped by slide shoes.

31. An apparatus as claimed in claim 20, comprising a device for taking off a part of the extract issuing from the apparatus and reinjecting said extract by spraying or projection into the plant or vegetable product entering said apparatus.

32. An apparatus as claimed in claim 31, wherein said taking off and reinjecting device comprises a pipe connected to said enclosure below the level of liquid, a pump connected to said pipe and discharging the extract through pipes respectively opening onto the inlet of the plant or vegetable product.

33. An apparatus as claimed in claim 20, wherein the outlet for the juice extracted from the treated product extends over portions of the outer and inner peripheral faces of said enclosure thus forming apertures, grills comprising substantially parallel bars being provided for masking said apertures, said grills being elastically biased towards said annular element.

34. An apparatus as claimed in claim 33, wherein said bars of said grills have a trapezoidal cross-sectional shape whose large base faces said annular elements.

35. An apparatus as claimed in claim 34, wherein a sleeve surrounds said enclosure at the height of said outlet apertures, a trough located at the base of said sleeve serving to discharge the extracted juice.

36. An apparatus as claimed in claim 20, comprising a step-by-step drive device drivingly connected to said annular element.

37. An apparatus as claimed in claim 36, comprising hydraulic jacks having synchronized actions for moving said thrust device and said pawl device.

38. An apparatus as claimed in claim 36, wherein said pawl device comprises a link pivoted to said enclosure, a pawl carried at the free end of said link, hooking means arranged in spaced relation on the periphery of said annular element and cooperating with said pawl, said pawl being radially movable by a jack bearing against said enclosure.

39. An apparatus as claimed in claim 38, wherein said hooking means comprise said outer ring and each of the successive pairs of spring strips fixed to said outer ring, said pawl being in the form of a yoke substantially similar to said yoke of said carriage.

40. An apparatus as claimed in claim 36, wherein said drive device comprises, on the periphery of said apparatus, a thrust device which is movable radially and circumferentially of the apparatus and having a position of rest into engagement with said annular element, a pawl device which is radially movable but fixed circumferentially of said apparatus and cooperable with said thrust device, said pawl device being angularly offset relative to said position of rest of said thrust device, the movements of said thrust device and of said pawl device preferably being produced by means of hydraulic jacks having synchronized actions.

41. An apparatus as claimed in claim 40, wherein said thrust device comprises a carriage having means whereby it is rollable on the outer face of said outer ring, a jack carried by said carriage, a yoke secured to said jack, hooking means on said annular element and with which said yoke is capable of cooperating, and a thrust jack bearing against said enclosure and pivoted to said yoke, said carriage being guided by a rail which is integral with said enclosure and prevents the carriage from tilting under the effect of the forces of said thrust jack.

42. An apparatus as claimed in claim 41, wherein said hooking means comprise points of intersection of pairs of said spring strips and said outer ring.

43. An installation for extracting soluble substances contained in products, such as plant or vegetable products, comprising two apparatuses connected in series relation, each apparatus comprising an annular element having a series of radial compartments which are separated by perforated partition walls and are open on the inner and outer peripheries of said annular element, means for driving said annular element in rotation about a substantially horizontal axis, a fixed enclosure substantially marrying up with the lower part of said annular element and comprising, located on each side of a vertical plane containing the axis of the annular element, an inlet aperture for solvent liquid and an outlet aperture for the extract from the plant or vegetable product, whereby to create inside said enclosure a flow of liquid whose direction is opposed to that of the rotation of said annular element, and a device for continuously introducing plant or vegetable products opening onto the periphery of said annular element so as to pour said products continuously into said successive compartments, said annular element comprising two spaced concentric rings, a plane annular wall interconnecting said two rings, said rings being combined with openwork partition walls which are in spaced relation and located on each side of said plane annular wall, said openwork partition walls being mounted in an elastically yieldable manner on said rings, whereby the outer radial edges of said openwork partition walls have an elastic freedom of movement relative to said rings.

* * * * *

UNITED STATES PATENT OFFICE
CERTIFICATE OF CORRECTION

Patent No. 3,632,445　　　　　　　Dated January 4, 1972

Inventor(s) Marcel Jean Charles Barre

It is certified that error appears in the above-identified patent and that said Letters Patent are hereby corrected as shown below:

Change the name of the assignee to: Societe Sucriere De L'Atlantique.

Change the name of the attorney to: Hugo Weisberger.

Claim 12, line 1, change "1" to --20--.

Signed and sealed this 13th day of June 1972.

(SEAL)
Attest:

EDWARD M. FLETCHER, JR.　　　　　ROBERT GOTTSCHALK
Attesting Officer　　　　　　　　Commissioner of Patents